24-21

SEARCH

BEST AVAILABLE COPY

THEODORE E. HARRIS.

Improvement in Machines for Shearing and Punching Shingle Bands.

No. 4,636. Reissued Nov. 14, 1871.

*Witnesses.*
C. F. Brown.
D. H. Ellsworth.

*Inventor.*
Theodore E. Harris,
By Hill & Ellsworth,
His Attys.

AM. PHOTO-LITHOGRAPHIC CO. N.Y. (OSBORNE'S PROCESS.)

UNITED STATES PATENT OFFICE.

THEODORE E. HARRIS, OF GREEN BAY, WISCONSIN.

IMPROVEMENT IN MACHINES FOR SHEARING AND PUNCHING SHINGLE-STRAPS.

Specification forming part of Letters Patent No. 67,429, dated August 6, 1867; reisssue No. 4,636, dated November 14, 1871.

*To all whom it may concern:*

Be it known that I, T. E. HARRIS, of Green Bay, in the county of Brown and State of Wisconsin, have invented an Improvement in the Manufacture of Sheet-Metal Shingle-Straps; and I do hereby declare the following to be a full, clear, and exact description of the same, reference being had to the accompanying drawing forming part of this specification, in which—

Figure 1:
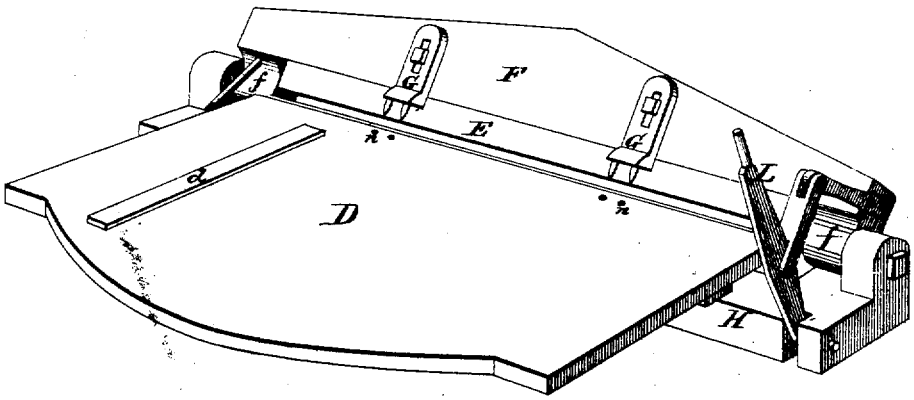
Figure 4:
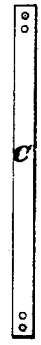
Figure 2:
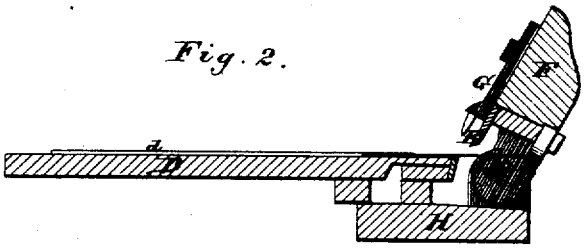
Figure 3:
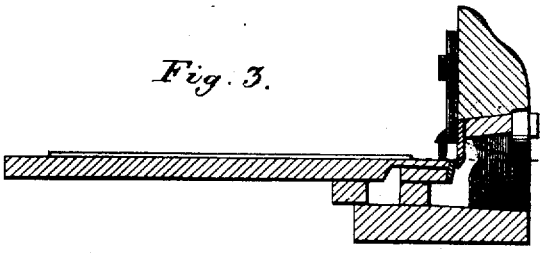

Figure 1 is a perspective view of the machine; Fig. 2, a vertical section of the same, showing the cutter thrown back; Fig. 3, a similar section, showing the cutter thrown forward; Fig. 4, a plan of the manufactured strip ready for use; and Fig. 5, a perspective view, showing the application of the strips to a bunch of shingles.

Similar letters of reference in the accompanying drawing denote the same parts.

Figure 5:
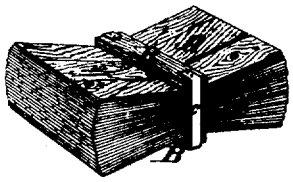

In packing shingles at the mill for the market the ordinary method has always been to arrange them with the points together, as shown at A in Fig. 5, and tie the ends of the wooden binders B B together by means of withes, cords, or wires, or connect them by strips of hoop-iron nailed or otherwise fastened to them. None of these articles have ever, to my knowledge, been prepared and put into the market as an article of manufacture and sale, but the manufacturer of the shingles has always been obliged to prepare them for his own use. Cords of any kind are objectionable on the score of expense, and also of weakness and liability to decay. Wires are difficult to fasten properly. Withes are not to be had in many localities, and hoop-iron, besides being scarce, is inconvenient to cut and punch at the mill. From these causes the supply of proper materials for tying the binders together has never been regular and reliable, and great inconvenience has resulted to manufacturers therefrom. The object of my invention is to produce a new article of manufacture and sale, which, being adapted to convenient use as a fastening for the binders, can be furnished to the market in any required quantities at a reasonable expense, thereby obviating all the inconveniences heretofore suffered from the cause referred to. To this end the invention consists, first, in the new article of manufacture, to wit, a cut and punched sheet-metal shingle-strip, formed substantially as shown in Fig. 4, and adapted to be applied as represented in Fig. 5; and secondly, in the machine for cutting said strips from the sheet metal and punching them at the same operation, substantially as hereinafter set forth.

In the drawing, A represents a bunch of shingles bound together by means of two wooden bars, B B, the ends of which are connected by the shingle-strip C. This strip is about twelve inches in length by three-fourths of an inch in width, and is punched, preferably, with two holes at each end, through which to nail it to the wooden binders. The holes may be arranged in any convenient manner for that purpose. The strip thus described is manufactured very conveniently and expeditiously upon a machine the general construction of which is represented in Figs. 1, 2, and 3; D being the table over which the sheet metal is fed to the cutter; *d*, a guide for properly registering the sheet of metal; E, the cutting-blade attached by any suitable means to a frame, F, which rocks upon trunnions *f f*; G G, adjustable punches, secured by slots and set-screws or other proper means to the front side of the frame F, and having their points adjusted to drop into holes *n n* in the table; H the supporting-frame of the machine, provided with lugs in which work the trunnions *f f*; and L, a hand-lever, which, in machines that are to be worked by hand, may be employed for the purpose of operating the rocking-frame with its cutter and punches.

The operation of the machine is as follows: The sheet of metal is placed on the table, registered against the cleat *d*, and pushed forward till its edge coincides with the edge of the table. The lever is then operated, and the punches make two holes near each side of the sheet. The lever is then raised and the sheet pushed forward to the proper distance, when the lever is brought down again, cutting off a shingle-strip from the already punched edge of the metal, and at the same time punching the edge of the remaining portion for the next strip. This process is continued till the sheet is used up.

Having described my invention, what I claim is—

1. A machine-cut-and-punched shingle-strip or bale-fastening, made from sheet-iron, substantially in the manner described.

2. The combination of the table D provided with holes *n n*, the punches G G adjusted to the holes, and the cutting-blade E, arranged to operate at the edge of the table in connection with the punches, and mechanism to reciprocate said blade and punches, substantially as described, for the purposes specified.

3. The combined machine herein described, consisting, essentially, of the frame H, table D, blade E, operating mechanism L, and adjustable punches G G, substantially as and for the purposes specified.

T. E. HARRIS.

Witnesses:
CHARLES D. ROBINSON,
C. D. SUYDAM.

(119)